(12) United States Patent
Walter et al.

(10) Patent No.: US 12,157,349 B2
(45) Date of Patent: Dec. 3, 2024

(54) HEAT EXCHANGER

(71) Applicant: MAHLE International GmbH, Stuttgart (DE)

(72) Inventors: Michael Walter, Charleston, SC (US); Uwe Foerster, Erdmannhausen (DE)

(73) Assignee: Mahle International GmbH, Stuttgart (DE)

( * ) Notice: Subject to any disclaimer, the term of this patent is extended or adjusted under 35 U.S.C. 154(b) by 50 days.

(21) Appl. No.: 17/182,939

(22) Filed: Feb. 23, 2021

(65) Prior Publication Data

US 2021/0260966 A1 Aug. 26, 2021

(30) Foreign Application Priority Data

Feb. 24, 2020 (DE) ...................... 10 2020 202 313.1

(51) Int. Cl.
*B60H 1/32* (2006.01)
*B60H 1/00* (2006.01)
(Continued)

(52) U.S. Cl.
CPC ....... *B60H 1/3228* (2019.05); *B60H 1/00335* (2013.01); *B60H 1/00571* (2013.01); *B60H 1/00885* (2013.01); *B60H 1/00907* (2013.01); *F25B 39/04* (2013.01); *F25B 40/00* (2013.01); *F28D 7/0075* (2013.01); *F28D 7/12* (2013.01); *F28D 9/0093* (2013.01); *B60H 2001/2271* (2013.01); *F25B 2339/047* (2013.01);
(Continued)

(58) Field of Classification Search
CPC .............. B60H 1/3228; B60H 1/00335; B60H 1/00571; B60H 1/00885; B60H 1/00907; B60H 2001/2271; F25B 39/04; F25B 40/00; F25B 2339/047; F25B 2400/121; F25B 2500/18; F25B 2339/04; F28D 7/0075; F28D 7/12; F28D 9/0093; F28D 2021/0068; F28D 7/0083
USPC ............................................ 62/498; 165/140
See application file for complete search history.

(56) References Cited

U.S. PATENT DOCUMENTS 2,070,091 A * 2/1937 Nutt .......................... F01P 7/16
123/196 AB
4,896,718 A * 1/1990 Trin ...................... F28F 9/0234
184/104.2
(Continued)

FOREIGN PATENT DOCUMENTS

| CN | 1779384 A | 5/2006 |
|---|---|---|
| CN | 101482349 A | 7/2009 |

(Continued)

*Primary Examiner* — Ljiljana V. Ciric
(74) *Attorney, Agent, or Firm* — Muncy, Geissler, Olds & Lowe, P.C.

(57) ABSTRACT

A heat exchanger for a refrigerant circuit of an air conditioning system, with a heat exchanger block with a first fluid channel for the flow of refrigerant and with a second fluid channel for the flow of a fluid. The first fluid channel and the second fluid channel are in thermal contact for the exchange of heat. The heat exchanger also includes a third fluid channel having a refrigerant inlet and a refrigerant outlet for the flow of the refrigerant. The first fluid channel is in direct thermal contact with the third fluid channel for the exchange of heat between the refrigerant in the first fluid channel and the refrigerant in the third fluid channel.

5 Claims, 5 Drawing Sheets

(51) Int. Cl.
*B60H 1/22* (2006.01)
*F25B 39/04* (2006.01)
*F25B 40/00* (2006.01)
*F28D 7/00* (2006.01)
*F28D 7/12* (2006.01)
*F28D 9/00* (2006.01)
*F28D 21/00* (2006.01)

(52) U.S. Cl.
CPC ..... *F25B 2400/121* (2013.01); *F25B 2500/18* (2013.01); *F28D 2021/0068* (2013.01)

(56) References Cited

U.S. PATENT DOCUMENTS

| | | | | |
|---|---|---|---|---|
| 5,113,930 | A * | 5/1992 | le Gauyer | F28F 9/0234 165/157 |
| 5,224,358 | A * | 7/1993 | Yamanaka | F25B 40/02 62/509 |
| 5,228,315 | A * | 7/1993 | Nagasaka | F25B 39/04 165/110 |
| 5,526,873 | A * | 6/1996 | Marsais | F01P 3/18 123/41.31 |
| 5,546,761 | A * | 8/1996 | Matsuo | F25B 39/04 62/509 |
| 5,709,106 | A * | 1/1998 | Inaba | F28D 1/0535 62/509 |
| 5,868,002 | A * | 2/1999 | Matsubayashi | F28F 9/0251 62/509 |
| 5,901,573 | A * | 5/1999 | Kobayashi | B60H 1/3227 62/509 |
| 5,927,102 | A * | 7/1999 | Matsuo | F25B 39/04 62/509 |
| 5,937,671 | A * | 8/1999 | Inoue | F25B 43/003 62/509 |
| 5,946,940 | A * | 9/1999 | Inoue | F28F 9/02 62/509 |
| 6,334,333 | B1 * | 1/2002 | Shinhama | F25B 39/04 62/509 |
| 6,374,632 | B1 * | 4/2002 | Nobuta | F25B 39/04 62/509 |
| 6,494,059 | B2 * | 12/2002 | Yamazaki | B60H 1/3229 62/509 |
| 6,708,522 | B2 * | 3/2004 | Yamazaki | F25B 43/003 62/509 |
| 6,793,012 | B2 * | 9/2004 | Fang | F28F 1/045 165/174 |
| 6,915,659 | B2 * | 7/2005 | Seno | F25B 39/04 62/529 |
| 6,942,023 | B2 * | 9/2005 | Fang | F28D 1/05375 165/140 |
| 7,059,393 | B2 * | 6/2006 | Fang | F28D 1/05375 165/174 |
| 7,093,461 | B2 * | 8/2006 | Patel | F25B 39/04 62/509 |
| 7,337,832 | B2 * | 3/2008 | Hu | F28D 1/05391 165/173 |
| 7,527,087 | B2 * | 5/2009 | Desai | F28D 1/05375 165/174 |
| 7,690,217 | B2 * | 4/2010 | Take | F28D 1/05366 62/498 |
| 8,141,383 | B2 * | 3/2012 | Heyl | F25B 41/39 62/509 |
| 8,205,667 | B2 * | 6/2012 | Yoshino | F28F 9/0246 165/178 |
| 8,464,550 | B2 * | 6/2013 | Kerler | B60H 1/005 62/515 |
| 8,561,681 | B2 * | 10/2013 | Antonijevic | F28F 13/00 165/135 |
| 9,255,740 | B2 * | 2/2016 | Bellenfant | F28D 1/0308 |
| 9,429,367 | B2 * | 8/2016 | Jouanny | F28D 9/005 |
| 9,664,423 | B2 * | 5/2017 | Matsumoto | F25B 39/04 |
| 9,671,169 | B2 * | 6/2017 | Riondet | F28F 1/06 |
| 9,746,255 | B2 * | 8/2017 | Xia | F28F 9/0273 |
| 9,945,614 | B2 * | 4/2018 | Foerster | F25B 40/00 |
| 10,059,173 | B2 | 8/2018 | Lee et al. | |
| 10,240,826 | B2 * | 3/2019 | Diem | F28F 9/0209 |
| 10,254,022 | B2 * | 4/2019 | Citti | F25B 39/00 |
| 2003/0209344 | A1 * | 11/2003 | Fang | F28F 1/045 165/174 |
| 2004/0200604 | A1 * | 10/2004 | Fang | F28D 1/0443 165/174 |
| 2004/0216863 | A1 * | 11/2004 | Hu | F28D 1/0443 165/110 |
| 2004/0261983 | A1 * | 12/2004 | Hu | F28F 1/126 165/148 |
| 2005/0006068 | A1 * | 1/2005 | Desai | F28F 9/0202 165/173 |
| 2005/0161203 | A1 * | 7/2005 | Fang | F28F 27/02 165/140 |
| 2006/0076125 | A1 * | 4/2006 | Fang | F28F 1/022 165/140 |
| 2006/0113068 | A1 * | 6/2006 | Desai | F28D 1/0417 165/140 |
| 2009/0178435 | A1 | 7/2009 | Hiyama | |
| 2011/0061410 | A1 * | 3/2011 | Narayanamurthy | F24F 5/0017 62/235.1 |
| 2019/0337359 | A1 * | 11/2019 | Toyama | F25B 41/22 |
| 2020/0033064 | A1 * | 1/2020 | Dziubinschi | F28D 7/0083 |
| 2021/0260966 | A1 * | 8/2021 | Walter | F25B 39/04 |

FOREIGN PATENT DOCUMENTS

| | | | | |
|---|---|---|---|---|
| CN | 203053095 U | | 7/2013 | |
| CN | 203605512 U | | 5/2014 | |
| CN | 104823014 A | | 8/2015 | |
| CN | 106414127 A | | 2/2017 | |
| CN | 109551996 A | | 4/2019 | |
| DE | 10122360 B4 * | | 4/2005 | ............ F25B 39/04 |
| DE | 112005001062 T5 * | | 4/2007 | ............ F25B 39/04 |
| DE | 102012221925 A1 | | 6/2014 | |
| DE | 102017109313 A1 | | 11/2018 | |
| DE | 102018117097 A1 | | 1/2020 | |
| DE | 102020121275 B4 * | | 8/2022 | |
| DE | 102022201431 A1 * | | 8/2023 | |
| EP | 2089664 B1 * | | 1/2016 | ......... F28D 1/0333 |
| EP | 2150757 B1 * | | 10/2018 | ......... F25B 39/022 |
| FR | 2979287 A1 | | 3/2013 | |
| JP | 10170188 A * | | 6/1998 | ........... F28F 9/0212 |
| JP | 2005524820 A * | | 8/2005 | |
| JP | 4970022 B2 * | | 7/2012 | ........ B60H 1/00328 |
| WO | WO-2008061362 A1 * | | 5/2008 | ......... F28D 1/0333 |
| WO | WO-2020022738 A1 * | | 1/2020 | ........ B60H 1/00335 |

* cited by examiner

HEAT EXCHANGER

This nonprovisional application claims priority under 35 U.S.C. § 119 (a) to German Patent Application No. 10 2020 202 313.1, which was filed in Germany on Feb. 24, 2020 and which is herein incorporated by reference.

BACKGROUND OF THE INVENTION

Field of the Invention

The present invention relates to a heat exchanger for a refrigerant circuit, in particular of a motor vehicle.

Description of the Background Art

In the prior art it is known that a condenser and an evaporator are arranged in a refrigerant circuit, wherein a compressor causes the refrigerant flow in the refrigerant circuit. During operation of the refrigerant circuit, the refrigerant in the condenser is cooled and possibly liquefied, and it is expanded or evaporated in the evaporator. In the condenser, which is located on the high-pressure side of the refrigerant circuit, the refrigerant is cooled from a higher refrigerant temperature by the second fluid flowing through it, and in the evaporator, which is located on the low-pressure side, the refrigerant is reheated from a lower refrigerant temperature by heat exchange. It has been found that the efficiency of the refrigerant circuit is not yet optimal. For this reason, so-called internal heat exchangers are increasingly being introduced into the refrigerant circuit, which brings the refrigerant on the high-pressure side into heat exchange with the refrigerant from the low-pressure side. This internal heat exchanger is located between the condenser and the evaporator on the one hand and between the evaporator and the compressor on the other. This achieves pre-cooling of the refrigerant in the high-pressure side refrigerant path by means of the refrigerant from the low-pressure side refrigerant path, which increases efficiency.

Nevertheless, this arrangement requires that the three heat exchangers be installed and connected to the refrigerant circuit with respective lines. This increases the logistics effort and the assembly effort.

SUMMARY OF THE INVENTION

It is therefore an object of the present invention to provide to create a heat exchanger and a refrigerant circuit with a heat exchanger, which is less complex in terms of cost and assembly.

An exemplary embodiment of the invention relates to a heat exchanger for a refrigerant circuit of an air conditioner, comprising a heat exchanger block having a first fluid channel as a refrigerant passage for flowing refrigerant as a first fluid therethrough and a second fluid channel for flowing a second fluid therethrough, said first fluid channel and said second fluid channel being in thermal contact for exchanging heat between said first fluid and said second fluid, wherein a first refrigerant inlet and a first refrigerant outlet are provided which are in fluid communication with said first fluid channel, wherein a first fluid inlet and a first fluid outlet are provided which are in fluid communication with the second fluid channel, wherein the first fluid channel and the second fluid channel form a heat exchanger block, wherein a third fluid channel is provided, which is provided as a second refrigerant channel for the flow of refrigerant therethrough, wherein a second refrigerant inlet and a second refrigerant outlet are provided, which are in fluid communication with the third fluid channel, wherein the first fluid channel is directly in thermal contact with the third fluid channel as an internal heat exchanger for the exchange of heat between the refrigerant in the first fluid channel with the refrigerant in the third fluid channel. In this way, the internal heat exchanger is integrated into the heat exchanger, such as a condenser, gas cooler or evaporator, so that a design that saves installation space can be achieved with good effective heat exchange.

In an example, the first fluid channel can be divided into a cooling and condensing section and a subcooling section for the refrigerant. As a result, the refrigerant in the cooling and subcooling section is first cooled from an initial temperature downstream of the compressor and then condensed when the condensing temperature is reached. This area is spatially optionally delimited by a refrigerant collector, in which the refrigerant is ideally stored in liquid form, i.e. condensed.

In an example, a refrigerant collector is provided which is fluidically connected to the first fluid channel and is flowed against by refrigerant or flowed through by refrigerant, so that the refrigerant collector is part of the first fluid channel in certain areas. Thus, in a heat exchanger as a combined condenser and internal heat exchanger, a further function of storing and optionally filtering the refrigerant is integrated to save installation space, which again reduces the number of interfaces to be sealed and optimizes the refrigerant circuit in terms of installation space and costs.

It is also useful if the refrigerant collector is fluidically connected to the first fluid channel between the cooling and condensing section and the subcooling section, or if the refrigerant collector is fluidically connected to the first fluid channel downstream of the subcooling section. The refrigerant collector is thus integrated into the heat exchanger in an advantageous and space-saving manner.

It is also useful if the third fluid channel is in direct thermal contact with the first fluid channel in the area of the refrigerant collector. This means that the third fluid channel is in thermal contact with the first fluid channel in the area where the refrigerant is advantageously already liquid and has thus reached at least the condensing temperature.

It is particularly advantageous if the third fluid channel contacts, surrounds and/or passes through the refrigerant collector on the outside and/or inside. Advantageously, a space-saving and effective design can thus be achieved.

It is also expedient if the refrigerant collector has a tubular housing, wherein the housing is double-walled at least in some areas and the first fluid channel is formed inside the housing and the third fluid channel is formed between the double walls. This integrates the internal heat exchanger into the wall of the housing, which is particularly space-saving.

It is also an advantageous design if the third fluid channel is in direct thermal contact with the first fluid channel in the area of the subcooling section. This enables an effective heat exchange because the refrigerant in the subcooling section assumes a relatively low temperature and is thus cooled even further by means of the pre-cooling with the internal heat exchanger.

It is also expedient if the third fluid channel is in direct thermal contact with the first fluid channel in the area of the first refrigerant outlet and/or the second refrigerant outlet. This can also achieve a design that saves installation space and is effective.

Furthermore, it is also expedient if the third fluid channel downstream of the refrigerant collector and/or downstream of the subcooling section is in direct thermal contact with the first fluid channel. This can also achieve a design that saves installation space and is effective.

Also, in an embodiment example, it is advantageous if the first fluid channel is formed by at least one first channel in at least one tube and the third fluid channel is formed by at least one second channel in at least one tube, wherein the at least one tube of the first channel is in contact and/or in thermal contact with the at least one tube of the second channel or the at least one tube of the first channel is also the at least one tube of the second channel and the at least one tube forms or receives the first channel and the second channel. Thus, in terms of manufacturing, an effective design can be achieved.

It is also advantageous if the at least one tube of the first fluid channel forms or form a channel stack with the at least one tube of the third fluid channel. In this way, an effective design can be achieved in terms of manufacturing.

Even so, it is advantageous if the at least one tube of the first fluid channel and/or the at least one tube of the third fluid channel is or are a flat tube. In this way, an effective and space-saving design can be achieved in terms of manufacturing.

It is also particularly advantageous if the at least one tube of the first fluid channel and/or the at least one tube of the third fluid channel is or are a straight, coiled or wound flat tube. This can also achieve an effective design that saves installation space.

It is also advantageous if the first fluid channel and the third fluid channel can be flowed through in counterflow and/or in parallel flow. Depending on the design, this enables effective heat exchange to be achieved with given installation space conditions.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention relates to a heat exchanger 1 for a refrigerant circuit 2 of an air conditioning system. In this case, the invention optionally relates to a heat exchanger 1 for a refrigerant circuit 2 of a motor vehicle. In the refrigerant circuit 2, the heat exchanger 1, a compressor 3, an expansion valve 4 and an evaporator 5 are provided. A refrigerant, for example R1234yf, R134a, etc., flows in the refrigerant circuit 2.

Figure 1:
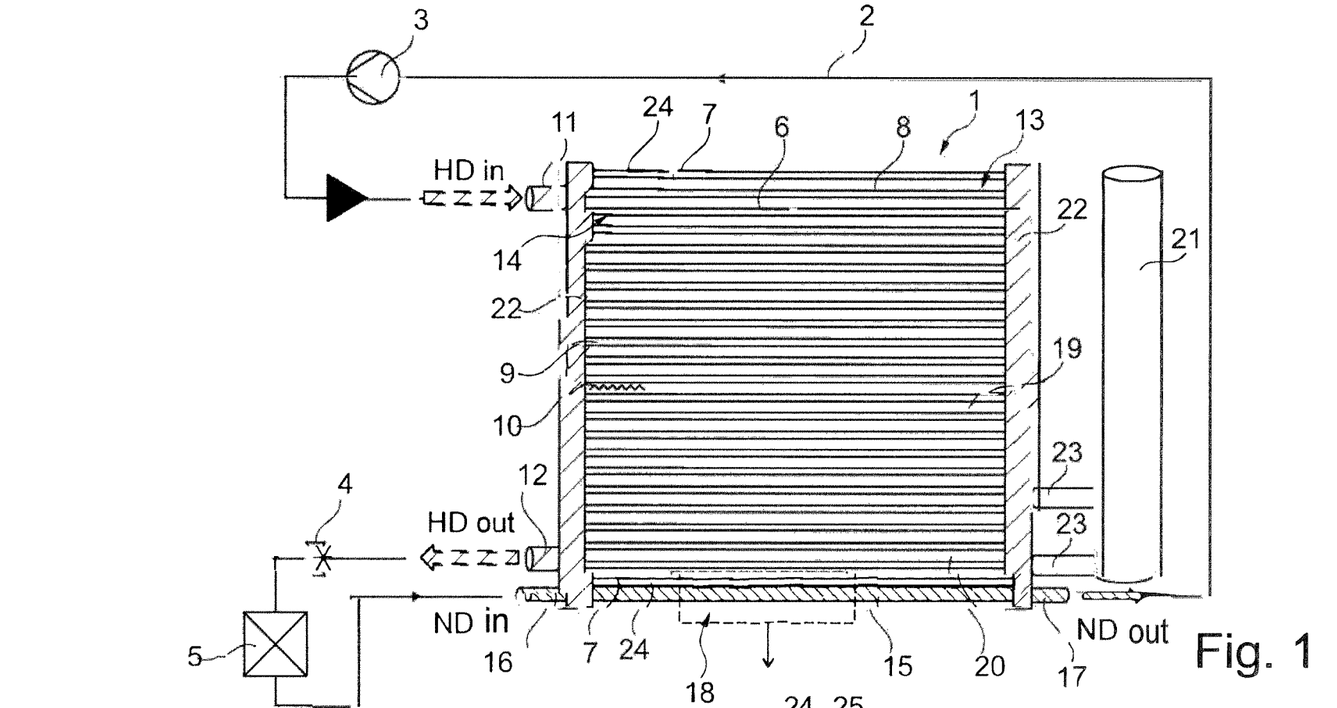
FIG. 1 shows a schematic, perspective view of a heat exchanger according to the invention.
Figure 2:
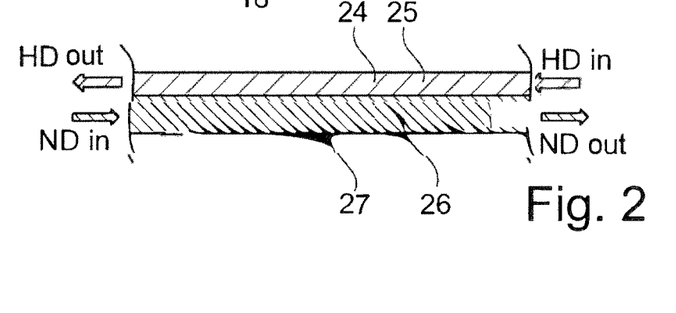
FIG. 2 shows a detailed representation of the heat exchanger according to FIG. 1.

The heat exchanger 1 according to FIGS. 1 and 2 has a heat exchanger block 6 with a first fluid channel 7 as a refrigerant channel for the flow of the refrigerant as a first fluid and a second fluid channel 8 for the flow of a second fluid, for example air or another gaseous or liquid coolant, such as water or a water mixture.

The first fluid channel 7 and the second fluid channel 8 are in thermal contact for the exchange of heat between the first fluid and the second fluid.

In the embodiment shown, the heat exchanger block 6 comprises a tube-fin block, wherein rows of fins 10, which form the second fluid channel 8 for the flow of air, are arranged between the tubes 9 which form the first fluid channel 7.

A first refrigerant inlet 11 and a first refrigerant outlet 12 are provided, which are in fluid communication with the first fluid channel 7.

Also provided are a first fluid inlet 13 and a first fluid outlet 14, which are in fluid communication with the second fluid channel 8.

Furthermore, a third fluid channel 15 is provided, which is provided as a second refrigerant channel for refrigerant to flow through. This third fluid channel 15 is integrated in the heat exchanger 1 and in the heat exchanger block 6. The heat exchanger 1 has a second refrigerant inlet 16 and a second refrigerant outlet 17, which are in fluid communication with the third fluid channel 15.

The heat exchanger 1 according to the invention is designed in such a way that the first fluid channel 7 is in direct thermal contact with the third fluid channel 15 as an internal heat exchanger 18 for exchanging heat between the refrigerant in the first fluid channel 7 with the refrigerant in the third fluid channel 15.

FIG. 2 shows this again in a magnified view. Fluid channel 7 and fluid channel 15 are in direct contact with each other, so that there is good thermal contact between the two fluid channels 7, 15.

The heat exchanger 1, with its heat exchanger block 6, has a substantially typical condenser design, wherein the first fluid channel 7 is divided into a cooling and condensing section 19 and a subcooling section 20 for the refrigerant.

A refrigerant collector 21 is also provided, which is fluidically connected to the first fluid channel 7 and is flowed against by refrigerant or flowed through by refrigerant, so that the refrigerant collector 21 is part of the first fluid channel 7 in certain areas.

Preferably, the refrigerant collector 21 is fluidically connected to or integrated in the first fluid channel 7 between the cooling and condensing section 19 and the subcooling section 20. Alternatively, the refrigerant collector 21 can also be fluidically connected to the first fluid channel 7 downstream of the subcooling section 20.

The refrigerant collector 21 is designed as a tubular body, which is in connection with the first fluid channel 7 by means of fluid communications 23, wherein the interior of the refrigerant collector 21 belongs to or is connected to the first fluid channel 7. Typically, the refrigerant collector 21 is adjacent to a header 22 of the heat exchanger block 6.

It can be seen in FIG. 1 that the third fluid channel 15 is in direct thermal contact with the first fluid channel 7 in the area of the subcooling section 20. For this purpose, the third fluid channel 15 is arranged downstream of the refrigerant collector 21 with respect to the refrigerant flow.

According to FIG. 1, the first fluid channel 7 is formed by at least one first channel 25 in at least one tube 24 and the third fluid channel 17 is formed by at least one second channel 26 in at least one tube 27.

In this case, the at least one tube 24 of the first channel 25 can be in contact with the at least one tube 27 of the second channel 26, in particular in contact and in thermal contact, or the at least one tube 24 of the first channel 25, also the at least one tube 27 of the second channel 26, are formed in one piece and thus accommodate the two channels 25, 26 together as a one-piece tube.

Thus, the at least one tube 24 of the first fluid channel 7 may form a channel stack with the at least one tube 27 of the third fluid channel 15.

Particularly advantageously, the at least one tube 24 of the first fluid channel 7 and/or the at least one tube 27 of the third fluid channel 15 is formed as a flat tube.

The refrigerant in the high-pressure phase HD hereby flows through the first fluid channel 7, coming from the compressor 3. The refrigerant in the low-pressure phase ND flows through the third fluid channel 15, coming from the evaporator 5.

Figure 3:
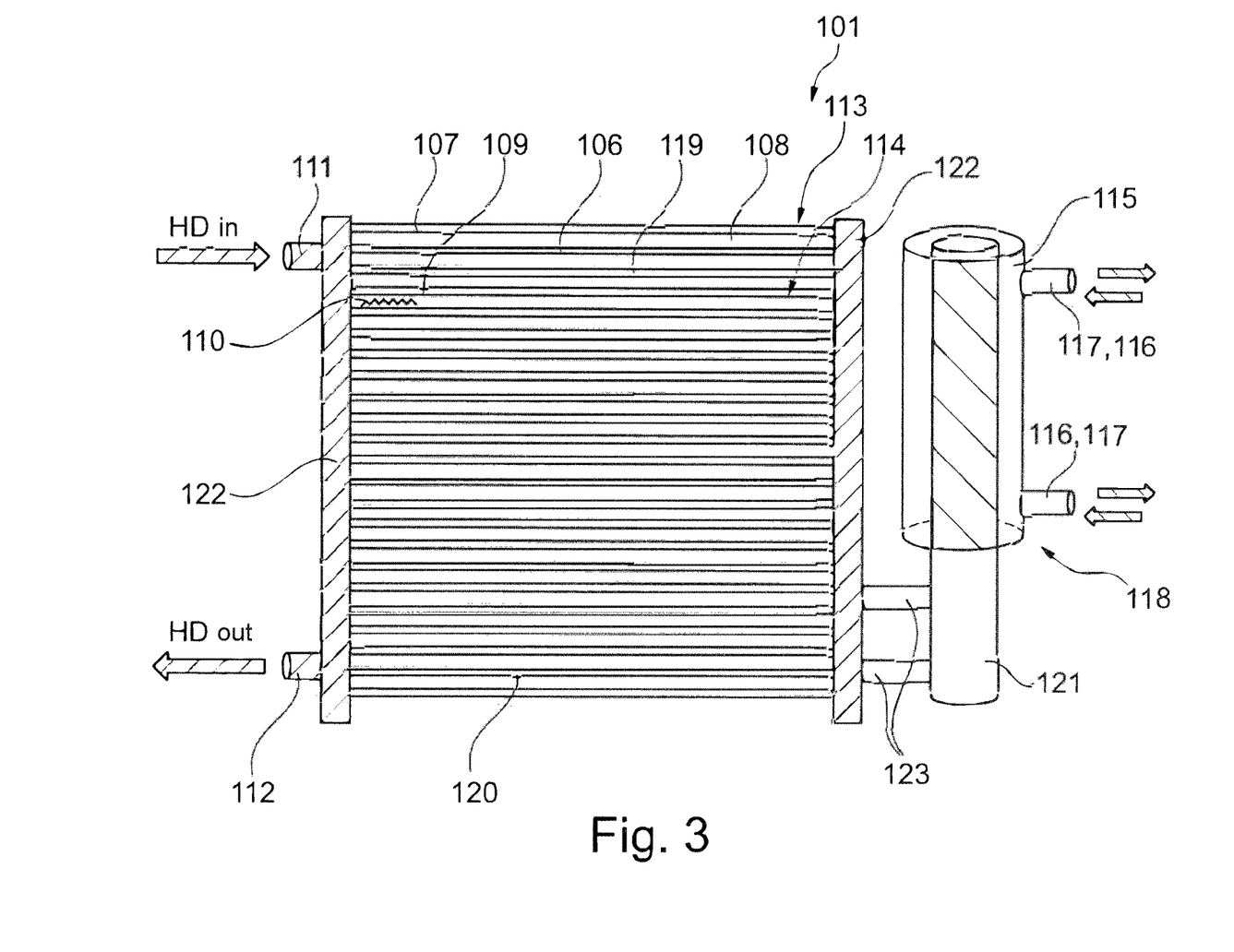
FIG. 3 shows a schematic, perspective view of a further heat exchanger according to the invention.
Figure 4:
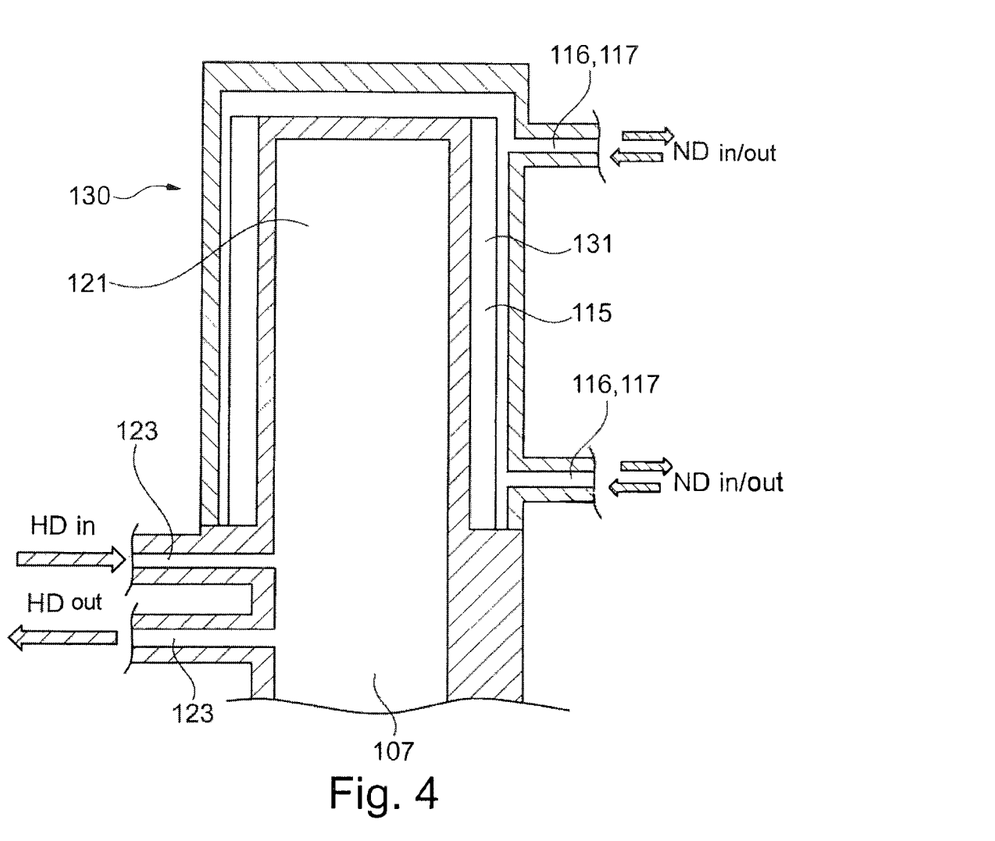
FIG. 4 shows a detailed representation of the heat exchanger according to FIG. 3.
Figure 5:
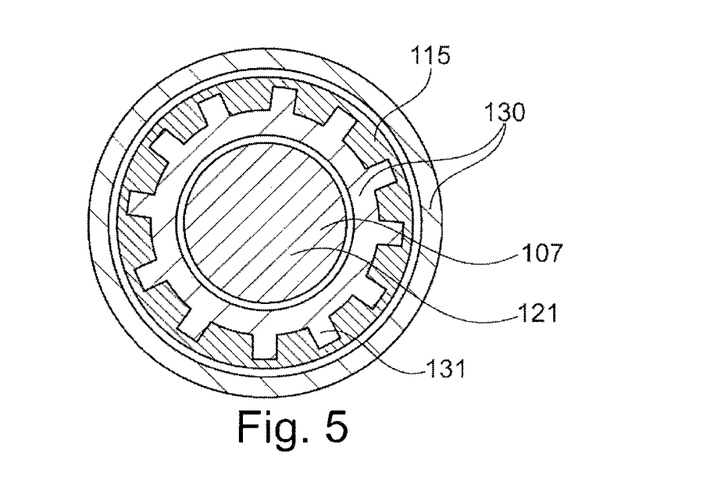
FIG. 5 shows a sectional view of the heat exchanger according to FIG. 4.

FIGS. 3 to 5 show a further embodiment of a heat exchanger 101 according to the invention. The heat exchanger 101 is provided for a refrigerant circuit 2 of an air conditioning system, as has already been explained for FIGS. 1 and 2. Here, the invention optionally relates to a heat exchanger 101 for a refrigerant circuit 2 of a motor vehicle. In the refrigerant circuit 2, according to FIG. 1, the heat exchanger 101, a compressor 3, an expansion valve 4 and an evaporator 5 are provided. A refrigerant, for example R1234yf, R134a, etc., flows in the refrigerant circuit 2. Here, the refrigerant flows in the high-pressure phase coming from the compressor 3 and in the low-pressure phase coming from the evaporator 5.

The heat exchanger 101 according to FIGS. 3 to 5 comprises a heat exchanger block 106 having a first fluid channel 107 as a refrigerant passage for flowing refrigerant as a first fluid therethrough and a second fluid channel 108 for flowing a second fluid therethrough, for example air or another gaseous or liquid refrigerant, such as water or a water mixture.

The first fluid channel 107 and the second fluid channel 108 are in thermal contact for exchanging heat between the first fluid and the second fluid.

In the embodiment shown, the heat exchanger block 106 formed of a tube-fin block, with rows of fins 110 forming the second fluid channel 108 for air to flow therethrough disposed between the tubes 109 forming the first fluid channel 107.

A first refrigerant inlet 111 and a first refrigerant outlet 112 are provided, which are in fluid communication with the first fluid channel 107.

Also provided are a first fluid inlet 113 and a first fluid outlet 114, which are in fluid communication with the second fluid channel 108.

Furthermore, a third fluid channel 115 is provided, which is provided as a second refrigerant channel for refrigerant to flow through. This third fluid channel 115 is integrated in the heat exchanger 101. The heat exchanger 101 has a second refrigerant inlet 116 and a second refrigerant outlet 117, which are in fluid communication with the third fluid channel 115. In this regard, the second refrigerant inlet 116 and the second refrigerant outlet 117 are selected depending on the direction of flow through the third fluid channel 115.

The heat exchanger 101 has a substantially typical condenser design with its heat exchanger block 106, wherein the first fluid channel 107 is divided into a cooling and condensing section 119 and a subcooling section 120 for the refrigerant.

A refrigerant collector 121 is also provided, which is fluidically connected to the first fluid channel 107 and is flowed against or flowed through by refrigerant, so that the refrigerant collector 121 is part of the first fluid channel 107 in certain areas.

Preferably, the refrigerant collector 121 is fluidically connected to or integrated in the first fluid channel 107 between the cooling and condensing section 119 and the subcooling section 120. Alternatively, the refrigerant collector 121 could also be fluidically connected to the first fluid channel 107 downstream of the subcooling section 120.

The refrigerant collector 121 is formed as a tubular body that communicates with fluid communications 123 to the first fluid channel 107, wherein the interior of the refrigerant collector 121 belongs to or is connected to the first fluid channel 107. Typically, the refrigerant collector 121 is adjacent to a header 122 of the heat exchanger block 106.

The third fluid channel 115 is integrated in the refrigerant receiver 121.

It is provided in the heat exchanger 101 according to the invention that the first fluid channel 107 is in direct thermal contact with the third fluid channel 115 as an internal heat exchanger 118 for exchanging heat between the refrigerant in the first fluid channel 107 with the refrigerant in the third fluid channel 115.

FIGS. 4 and 5 show this again in more detail in an enlarged view. The fluid channel 107 and the fluid channel 115 are in direct contact with each other, so that there is good thermal contact between the two fluid channels 107, 115. The third fluid channel 115 is in direct thermal contact with the first fluid channel 107 in the region of the refrigerant collector 121. In this case, the third fluid channel 115 contacts the refrigerant collector 121 on the outside and advantageously surrounds it, see FIGS. 4 and 5.

In this case, the refrigerant collector 121 has a tubular housing 130, the housing 130 being double-walled at least in some areas and the first fluid channel 107 being formed inside the housing 130 and the third fluid channel 115 being formed between the double walls. For this purpose, the inner wall can advantageously and optionally have outwardly projecting ribs 131 that optionally project radially.

Here, the refrigerant in the high-pressure phase flows through the first fluid channel 107, coming from the compressor 3. The refrigerant in the low-pressure phase flows through the third fluid channel 115, coming from the evaporator 5.

In this regard, for all embodiments, it is the case that the first fluid channel 107 and the third fluid channel 115 can be flowed through in counterflow and/or parallel flow.

Figure 6:
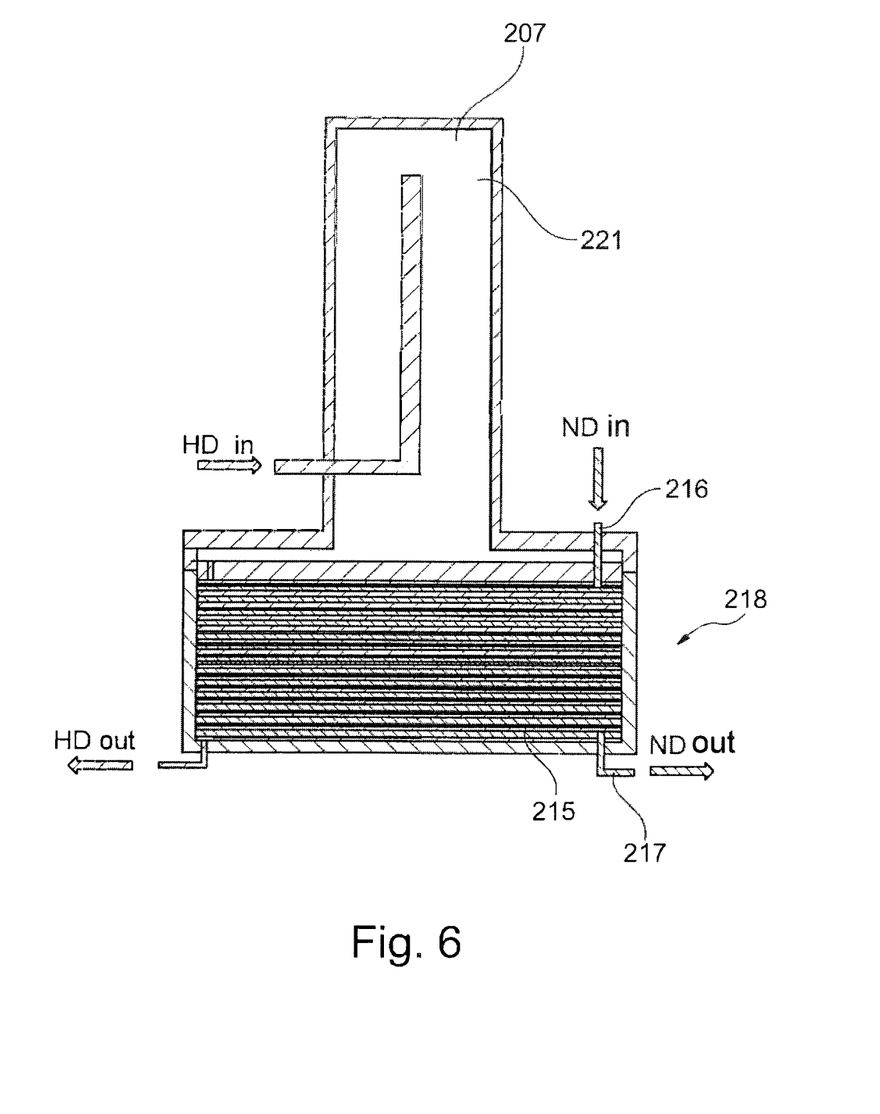
FIG. 6 shows a detailed representation of an alternative heat exchanger according to the invention.

FIG. 6 shows another embodiment in which the refrigerant collector 221 integrates the internal heat exchanger 218 between the first fluid channel 207 and the third fluid channel 215. Here, tubes or plates are stacked in the refrigerant collector 221 forming an arrangement of the alternating fluid channels 207, 215 to form the internal heat exchanger 218. A second refrigerant inlet 216 and a second refrigerant outlet 217 are provided.

The embodiments shown so far indicate that the internal heat exchanger 18, 118, 218 is integrated in the heat exchanger block or in the refrigerant collector. It is also possible that the third fluid channel is in direct thermal contact with the first fluid channel in the region of the first refrigerant outlet and/or the second refrigerant outlet.

Also, the third fluid channel may be in direct thermal contact with the first fluid channel downstream of the refrigerant collector and/or downstream of the subcooling section.

FIG. 2 shows that the at least one tube 24 of the first fluid channel 7 and/or the at least one tube 27 of the third fluid channel 15 is a straight tube.

Figure 7:
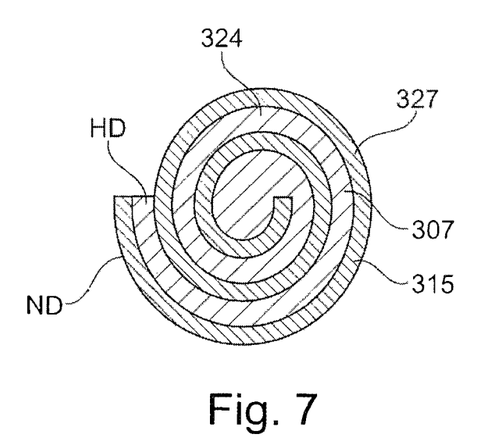
FIG. 7 shows a detailed representation of a further heat exchanger according to the invention.
Figure 8:
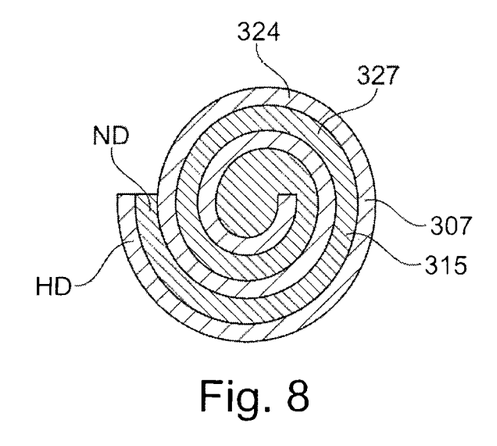
FIG. 8 shows a further detailed representation of a further heat exchanger according to the invention.

FIGS. 7 and 8 show that the at least one tube 324 of the first fluid channel 307 and/or the at least one tube 327 of the third fluid channel 315 are a coiled or wound flat tube or tubes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for a refrigerant circuit of an air conditioner, the heat exchanger comprising:
   a heat exchanger block having a first header, a second header, a first fluid channel through which a refrigerant flows and having a second fluid channel through which a fluid flows, the first fluid channel and the second fluid channel being in thermal contact for exchanging heat between the refrigerant in the first fluid channel and the fluid in the second fluid channel;
   a first refrigerant inlet;
   a first refrigerant outlet, the first refrigerant inlet and the first refrigerant outlet being in fluid communication with the first fluid channel;
   a first fluid inlet and a first fluid outlet that are in fluid communication with the second fluid channel;
   a third fluid channel through which the refrigerant flows, the third fluid channel being disposed in a housing that is separate from the first header and the second header of the heat exchanger block; and
   a second refrigerant inlet and a second refrigerant outlet that are in fluid communication with the third fluid channel,
   wherein a refrigerant collector is provided, which is fluidically connected to the first fluid channel, wherein the refrigerant collector is disposed, at least partially, in the housing, and wherein the refrigerant of the first fluid channel flows through the refrigerant collector, and
   wherein the refrigerant collector is in direct thermal contact with the third fluid channel to exchange heat between the refrigerant of the first fluid channel that flows through the refrigerant collector with the refrigerant in the third fluid channel.

2. The heat exchanger according to claim 1, wherein the third fluid channel contacts, surrounds and/or traverses the refrigerant collector on the outside and/or inside.

3. The heat exchanger according to claim 1, wherein the housing is tubular, wherein at least a portion of the housing is double-walled and the refrigerant of the first fluid channel flows inside the housing and the third fluid channel is formed between the double walls.

4. The heat exchanger according to claim 1, wherein the second refrigerant inlet and the second refrigerant outlet of the third fluid channel extend from the housing, and wherein the third fluid channel is in direct thermal contact with the first fluid channel adjacent to the second refrigerant outlet.

5. A heat exchanger for a refrigerant circuit of an air conditioner, the heat exchanger comprising:
   a heat exchanger block having a first header, a second header, a first fluid channel through which a refrigerant flows and having a second fluid channel through which a fluid flows, the first fluid channel and the second fluid channel being in thermal contact for exchanging heat between the refrigerant in the first fluid channel and the fluid in the second fluid channel;
   a first refrigerant inlet;
   a first refrigerant outlet, the first refrigerant inlet and the first refrigerant outlet being in fluid communication with the first fluid channel;
   a first fluid inlet and a first fluid outlet that are in fluid communication with the second fluid channel;
   a third fluid channel through which the refrigerant flows; and
   a second refrigerant inlet and a second refrigerant outlet that are in fluid communication with the third fluid channel,
   wherein a refrigerant collector is provided, which is fluidically connected to the first fluid channel, such that the refrigerant of the first fluid channel flows through the refrigerant collector,
   wherein the refrigerant collector has a tubular housing, at least a portion of the housing being double-walled and the refrigerant of the first fluid channel flowing inside the housing and the third fluid channel being formed between the double walls of the housing, and
   wherein the refrigerant collector is in direct thermal contact with the third fluid channel to exchange heat between the refrigerant of the first fluid channel that flows inside the housing of the refrigerant collector with the refrigerant in the third fluid channel.

* * * * *